March 29, 1927. 1,622,609
J. J. QUINN
MEAT SLICER
Filed Sept. 1, 1925
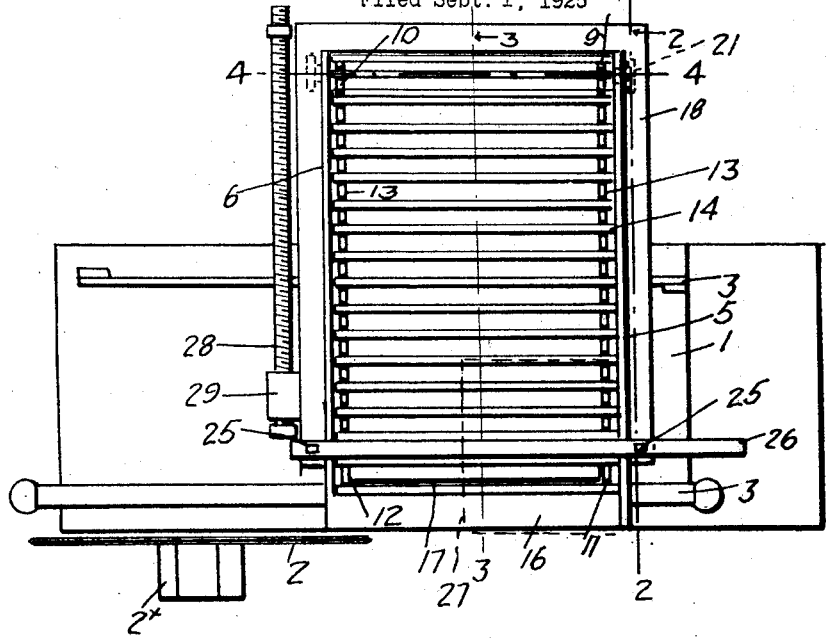
FIG.1.
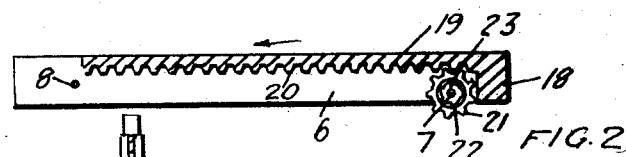
FIG.2.
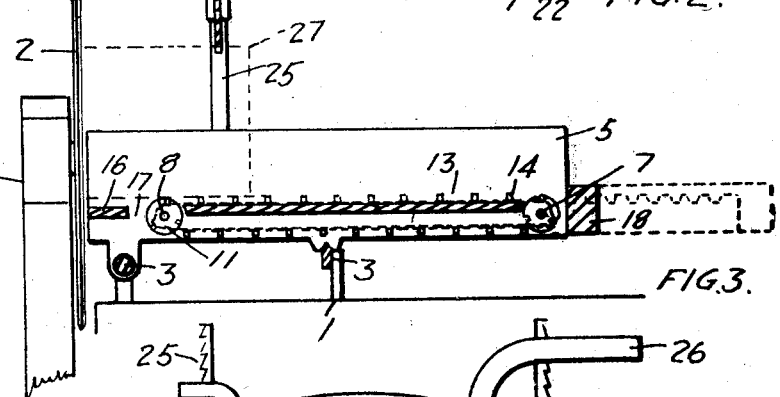
FIG.3.
FIG.5.
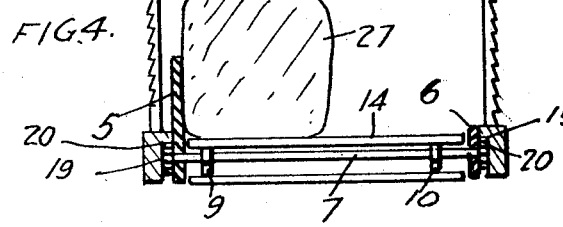
FIG.4.
INVENTOR
J.J.QUINN
BY
atty.

Patented Mar. 29, 1927.

1,622,609

UNITED STATES PATENT OFFICE.

JAMES JOSEPH QUINN, OF MIMICO, ONTARIO, CANADA.

MEAT SLICER.

Application filed September 1, 1925. Serial No. 53,852.

My invention relates to improvements in meat slicers, and the object of the invention is to devise means for securely holding the meat during the slicing operation so that it will be fed forward continuously as the slices are cut, and dispense with the repeated unclamping and reclamping of the meat after each small section thereof has been cut into slices, and it consists essentially of the arrangement and construction of parts as hereinafter more particularly explained.

Fig. 1 is a plan view of my device.

Fig. 2 is a sectional view on line 2—2 Figure 1.

Fig. 3 is a sectional view on line 3—3 Figure 1.

Fig. 4 is a sectional view on line 4—4 Figure 1 looking in the direction of arrow.

Fig. 5 is an enlarged detail of the driving sprockets of the conveyor.

In the drawings like characters of reference indicate corresponding parts in each figure.

1 indicates the main table or support. 2 is the circular knife which is rotated and operated in the usual manner, being mounted upon a standard $2^x$. 3 are the usual guides by which the meat supporting table 4 is supported to slide towards and away from the cutting edge of the rotating knife. The longitudinal side of the table 4 remote from the knife 2 is provided with a wall 5 for a purpose which will hereinafter appear.

The opposite parallel edge of the table 4 is provided with a wall 6 which extends slightly above the level of the table.

7 and 8 are shafts journalled in the walls 5 and 6. 9 and 10 are sprocket gears secured to the shaft 7. 11 and 12 are sprocket gears secured to the shaft 8.

A slatted conveyor comprising chains 13 mounted to revolve respectively upon the gears 9 and 11 and 10 and 12, and cross slats 14 extending between the chains 13 and secured thereto, thereby forming an endless conveyor upon which the meat is supported to travel gradually towards the cutting knife in a direction at right angles thereto.

16 is a cutting plate onto which the meat is fed from the slats 15 of the conveyor, such plate being mounted so as to form an intervening slot 17 between its inner edge and the edge of the table 4 through which the slats 15 pass from a position above to a position below the table 4 to pass beneath the table during their return movement. At the end of their return movement the slats return upward at the rear end of the table 4 as clearly indicated in Figure 3.

18 is a U-shaped frame slidably mounted upon the main table 1 and provided in its side arms with under-cut portions 19, each of which is provided with a longitudinal rack 20 see Figure 2.

21 are sprocket wheels provided with a recessed interior 22. 23 are ratchet wheels secured to the shaft 7 within the interior of each sprocket 21. 24 is a pawl pivotally mounted within the sprocket wheel 21 so as to engage with the teeth of the ratchet 23 to permit a driving movement between the rack 20 and the sprocket 21 during the movement of the frame 18 in the direction of arrow, see Figure 2, and an idling or non driving movement when the frame 18 is moved outward or in the opposite direction to arrow.

25 are clamping standards of usual construction carried by the frame 18 in proximity to the extreme end of each arm of the frame.

26 is a clamping lever coacting with the standards and extending over the piece of meat indicated by dotted lines in Figures 1 and 3 and designated by the numeral 27. The lever 26 is operated in the usual manner to clamp the meat down, such meat being forced downward against the cross slats 15 of the conveyor. 28 is a feed screw mounted in bearings carried by the main support and rotatably driven from any suitable source, such as is commonly employed in this class of machine.

29 is an internally threaded boss carried by the frame 18 and through which the feed screw 28 extends.

Having described the principal parts involved in my invention I will briefly describe the operation of the same.

Before operating the device the feed screw is rotated so as to carry the frame 18 together with the clamp 26 in an outward direction to the position indicated by dotted lines in Figure 3. The piece of meat is then clamped upon the slats 15 by the clamping lever 26, such lever engaging the meat adjacent or remote from that end of the piece of meat which is to be cut in slices, one side of the meat being held firmly against the wall 5. The feed screw 28 is then driven to rotate in a direction to carry the frame 18 slowly inward towards the cutting knife.

As the frame 18 is carried inward the racks 20 thereof engaging the ratchet wheels 21 impart a corresponding movement to the slats 15 of the conveyor so that they travel inward towards the cutting knife in unison with the movement of the frame 18, and therefore by this means the meat is continuously fed onto the plate 16 and to the cutting knife so that the piece of meat is cut into slices from one end of the piece of meat to practically the opposite end without any re-adjustment of the clamping lever 26.

If the piece of meat is a large one after the first forward movement of the frame 18 the clamp 26 is released and moved back with the frame 18, the meat and conveyor remaining stationary, to the new clamping position so that the adjustment is made without handling the meat. The frame 18 and the meat is then again carried forward to the knife.

From this description it will be seen that I have devised a very simple means by which a piece of meat may be held in a slicing machine so as to be continuously fed to the cutting knife as it is cut into slices, thereby dispensing with the unnecessary labour and loss of time involved in re-clamping the meat in various positions and moving the meat forward at each clamping operation, whereby the meat is cut into slices section by section.

By my device as before stated instead of the meat being cut into slices section by section, the whole piece of meat is cut continuously into slices without any re-adjustment. When the cutting operation is complete the frame 18 is free to move in an outward direction towards the dotted position shown in Figure 3 by means of the ratchet connection between the sprockets 21 and the shaft 7, the pawl 24 slipping over the teeth of the ratchet 23 during this operation.

What I claim as my invention is:

1. In a meat slicing machine, the combination with the main support, feed screw and rotating knife, of an endless conveyor forming a support for the piece of meat to be sliced by the cutting knife, means for clamping the meat to the conveyor, and means operated by the feed screw to simultaneously revolve the conveyor to carry the meat and the meat clamping means forward in unison towards the cutting knife.

2. In a meat slicing machine, the combination with the main support, feed screw and rotating knife, of an endless conveyor forming a support for the piece of meat to be sliced by the cutting knife, a frame provided with side bars, means operated by the feed screw for moving the bars forward, and means operated by the forward movement of the frame for revolving the conveyor.

3. In a meat slicing machine, the combination with the main support, a feed screw and rotating knife, of an endless conveyor forming a support for the piece of meat to be sliced by the cutting knife, a frame provided with side bars, means operated by the feed screw for moving the bars forward, means operated by the forward movement of the bars for revolving the conveyor, and means for permitting the return movement of the frame while out of driving engagement with the conveyor.

4. In a meat slicing machine, the combination with the main support, and rotating knife, of an endless conveyor, carrying shafts for the conveyor, gear wheels carried by one of said shafts, a U-shaped frame mounted to move horizontally and having the side arms thereof extending at each side of the conveyor, a rack formed on each of said side arms and engaging with the corresponding gear of the aforesaid carrying shaft, a meat clamping device carried by the frame, and means for moving the frame forward towards the cutting knife.

5. In a meat slicing machine, the combination with the main support and rotating knife, of an endless conveyor forming a support for the meat to be sliced, carrying shafts for the conveyor, a U-shaped frame extending at each side of the conveyor, a clamping device carried by the frame for clamping the meat to the conveyor, and a gear connection between the frame and carrying shaft of the conveyor adapted to be operative during the forward movement of the frame and inoperative during its backward movement.

JAMES JOSEPH QUINN.